(12) United States Patent
Au (10) Patent No.: US 10,601,364 B1
(45) Date of Patent: Mar. 24, 2020

(54) SOLAR WIND FENCE FOR AN ARRAY OF TRACKERS

(71) Applicant: NEXTracker Inc., Fremont, CA (US)

(72) Inventor: Alexander W. Au, El Cerrito, CA (US)

(73) Assignee: NEXTRACKER INC., Fremont, CA (US)

(*) Notice: Subject to any disclaimer, the term of this patent is extended or adjusted under 35 U.S.C. 154(b) by 849 days.

(21) Appl. No.: 14/922,087

(22) Filed: Oct. 23, 2015

Related U.S. Application Data

(60) Provisional application No. 62/068,323, filed on Oct. 24, 2014.

(51) Int. Cl.
*H02S 20/32* (2014.01)
*H02S 50/00* (2014.01)
*H02S 30/10* (2014.01)
*H02S 20/23* (2014.01)

(52) U.S. Cl.
CPC .............. *H02S 20/32* (2014.12); *H02S 20/23* (2014.12); *H02S 30/10* (2014.12); *H02S 50/00* (2013.01)

(58) Field of Classification Search
CPC .......... H02S 20/10; H02S 20/20; H02S 20/22; H02S 20/23; H02S 20/30; H02S 20/32; H02S 30/00; H02S 30/10; H02S 50/00; F24S 30/425; F24S 25/65; F24S 25/70; F24S 25/10; F24S 25/33; H01L 31/054; Y02E 10/47; Y02E 10/50; F24J 2002/5482; F24J 2002/5444; F24J 2002/5489; F24J 2/523; F24J 2/541; F24J 2/5264; F24J 2/2505; F24J 2/526
USPC .................................................. 136/246, 255
See application file for complete search history.

(56) References Cited

U.S. PATENT DOCUMENTS

2011/0023940 A1\* 2/2011 Do .......................... H02S 20/00
136/246

\* cited by examiner

*Primary Examiner* — Eli S Mekhlin
*Assistant Examiner* — Dujuan A Horton
(74) *Attorney, Agent, or Firm* — Weber Rosselli & Cannon LLP (57) ABSTRACT

A solar tracker array has solar modules that may be configured to operate as a wind fence according to a wind characteristic.

13 Claims, 7 Drawing Sheets

SOLAR WIND FENCE FOR AN ARRAY OF TRACKERS

CROSS REFERENCE TO RELATED APPLICATION

The present disclosure claims the benefit of U.S. Provisional Application No. 62/068,323, filed on Oct. 24, 2014, which is incorporated by reference herein in its entirety.

BACKGROUND

The present application relates generally to a tracking system for solar panels. More specifically, embodiments provide tracking systems that are suitable for solar panels. In a specific embodiment, a tracking system is fully adjustable at each of the pillars, a plurality of tracking systems working in conjunction with each other to protect the system as a whole, among other aspects. There are other embodiments as well.

As the population of the world increases, industrial expansion has led to an equally large consumption of energy. Energy often comes from fossil fuels (including coal and oil), hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, alternative sources of energy have been developed.

Along oil, people have also relied upon other sources of energy such as hydroelectric, nuclear, and the like to provide our electricity needs. For example, most of the conventional electricity required for home and business use come from coal- or natural gas-fired turbines, nuclear power generation plants, and hydroelectric plants, as well as other forms of renewable energy. Home and business use of electrical power has been stable and widespread.

Much of the useful energy found on the Earth comes from our sun. Generally all common plant life on the Earth achieves life using photosynthesis processes from sun light. Fossil fuels such as oil were also developed from biological materials derived from energy associated with the sun. For human beings, sunlight has been essential. For life on the planet Earth, the sun has been the most important energy source and fuel for modern day solar energy.

Solar energy possesses many desirable characteristics. Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications.

Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed to address this issue. Unfortunately, conventional solar tracking techniques are often inadequate. These and other limitations are described throughout the present specification, and may be described in more detail below.

From the above, it is seen that techniques for improving solar systems are highly desirable.

SUMMARY

In an example, the present invention provides a solar tracker apparatus. The apparatus has a torque tube; and a plurality of solar modules configured spatially along the torque tube and configured as a wind shield for an interior zone comprising a plurality of tracker apparatus. In an example, the plurality of solar modules are configured to change a direction of on-coming wind to move substantially over a plurality of solar modules configured on the plurality of tracker apparatus in the interior zone. In an example, each of the plurality of solar modules in the interior region is configured in a substantially normal direction with respect to a direction of gravity.

In an example, the apparatus is provided within an exterior zone of an array of solar tracker apparatus; wherein the plurality of solar modules configured to change the direction is configured as a wind fence, and configured in an offensive position to divert the on-coming wind, while the plurality of solar modules in the interior region are configured in a defensive position and each of the solar panels are protected from the plurality of solar modules provided on the exterior zone.

In an example, the apparatus is provided within an exterior zone and each of the plurality of solar modules is configured to act as a wind fence for an interior zone of an array of solar tracker apparatus.

In an example, the present invention provides a solar system comprising an array of solar modules. The system has an interior zone comprising a first plurality of tracker apparatus, each of which is configured with a first plurality of solar modules; and an exterior zone comprising at least one tracker apparatus configured with a torque tube configured within a frame structure having a first interior stop region and a second interior stop region. In an example, the torque tube is capable of moving about an arc from a first angle to a second angle. In an example, a plurality of solar modules are disposed with the frame structure are configured as a windshield.

In an example, the present invention provides a method of operating a solar array system. In an example, the method includes providing an array of solar modules. In an example, the array of solar modules comprises an interior zone comprising a first plurality of tracker apparatus, each of which is configured with a first plurality of solar modules, and an exterior zone comprising at least one tracker apparatus configured with a torque tube configured within a frame structure having a first interior stop region and a second interior stop region. In an example, the torque tube is capable of moving about an arc from a first angle to a second angle. In an example, the method includes detecting a predetermined wind characteristics during a time frame, the wind characteristic being in one of a plurality of ranges. In an example, the plurality of ranges including at least a first range, a second range, and a third range. In an example, the method includes configuring the one tracker apparatus in a normal state when the wind characteristic in the first range; configuring the one tracker apparatus in a defensive state configured to allow each of the first plurality of tracker apparatus to be operable in a normal manner to rotate each of the solar modules in a range from about −60 Degrees to +60 Degrees when the wind characteristic in the second range. The method includes configuring the one tracker apparatus in a defensive state and each of the plurality of first plurality of tracker apparatus in a locked at 0 Degrees state when the wind characteristic in the third range.

DETAILED DESCRIPTION

In conventional tracker designs, wind forces may lead to uncontrollable movement of the solar modules on the tracker leading to an increase in resonance and movement until supporting or positioning components, such as a torque tube or a slew gear, breaks. Once a row of trackers is influenced by such wind forces, other trackers that may be adjacent to the that row are influenced and may participate in the uncontrollable movement.

Figure 1:
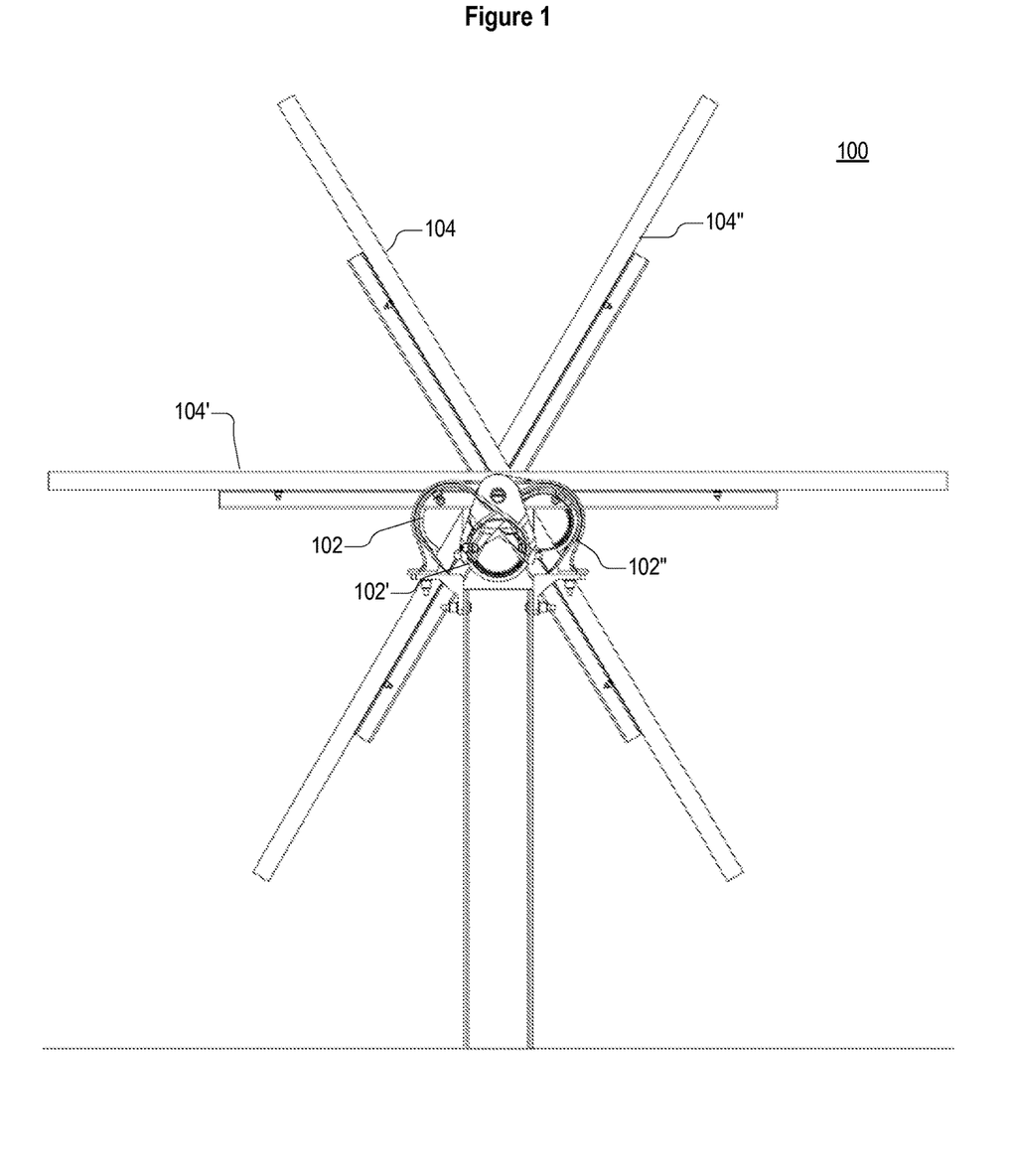
FIG. 1 is a simplified diagram illustrating a solar tracker configured in different angles according to an embodiment.

FIG. 1 is a simplified diagram illustrating a solar tracker 100 configured in different angles according to an illustrative embodiment. The solar tracker 100 has a torque tube 102 and a plurality of solar modules 104 configured spatially along the torque tube 102.

When the solar tracker 100 is configured in a first angle, the torque tube 102 and the plurality of solar modules 104 are respectively disposed as indicated by reference character 102 and 104. When the solar tracker 100 is configured in a second (horizontal) angle, the torque tube 102 and the plurality of solar modules 104 are respectively disposed as indicated by reference character 102' and 104'. When the solar tracker 100 is configured in a third angle, the torque tube 102 and the plurality of solar modules 104 are respectively disposed as indicated by reference character 102" and 104".

FIG. 1 shows the first, second, and third angles in which the solar tracker 100 may be configured, but embodiments are not limited thereto. In an embodiment, the torque tube 102 is capable of moving about an arc from the first angle to the third angle.

Figure 2:
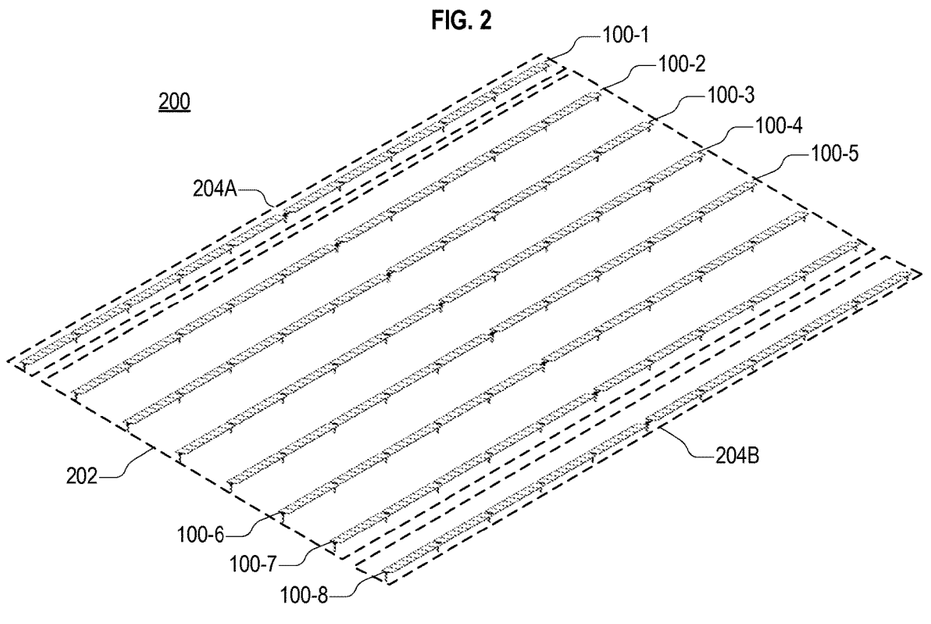
FIG. 2 shows a solar array system including a plurality of solar trackers in a normal operating mode according to an embodiment.

FIG. 2 shows a solar array system (also known as a solar system) 200 including first to eighth solar trackers 100-1 to 100-8 in a normal operating mode according to an embodiment. The solar array system 200 includes an interior zone 202 and first and second exterior zones 204A and 204B.

The first solar tracker 100-1 is disposed in the first exterior zone 204A. The second to seventh solar trackers 100-2 to 100-7 are disposed in the interior zone 202. The eighth solar tracker 100-8 is disposed in the second exterior zone 204B.

Figure 3:
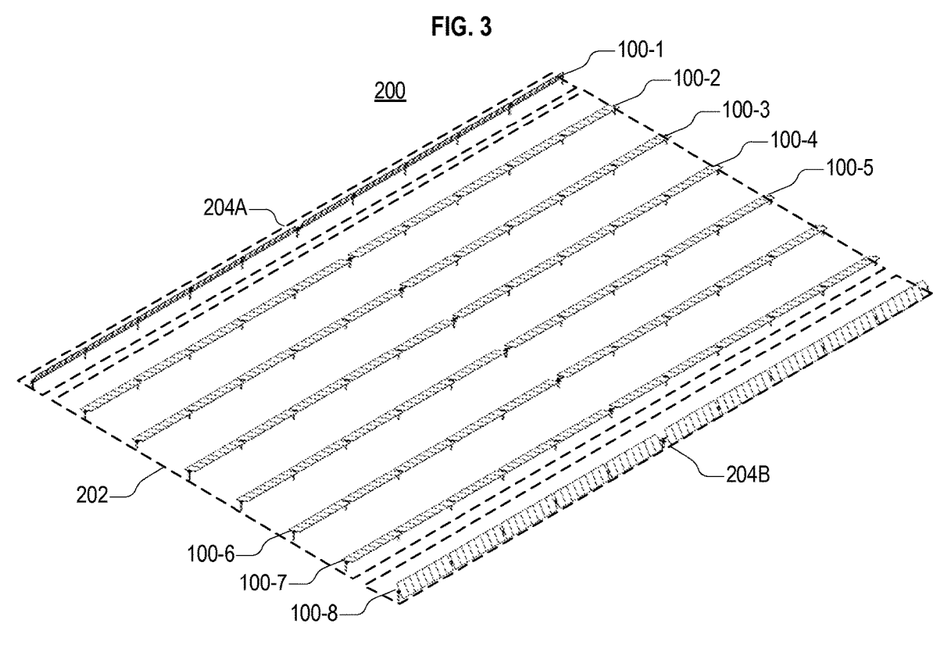
FIG. 3 shows a configuration of the solar array system in a partial defense mode having outer solar trackers configured as a wind fence according to an embodiment.
Figure 4:
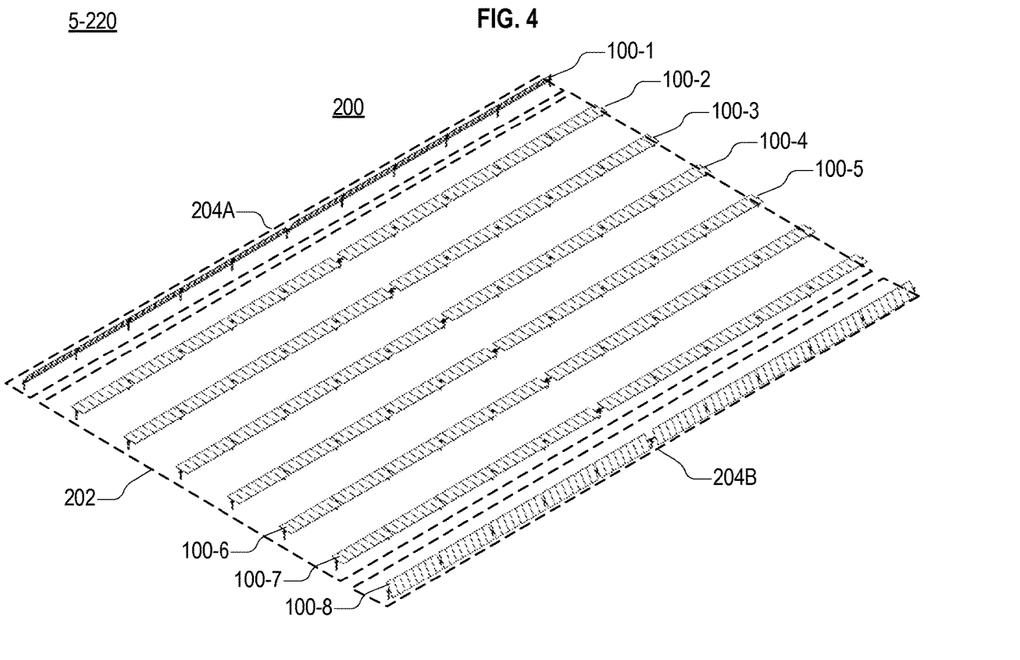
FIG. 4 shows a configuration of the solar array system in a full defense mode having outer solar trackers configured as a solar wind fence according to an embodiment.
Figure 5:
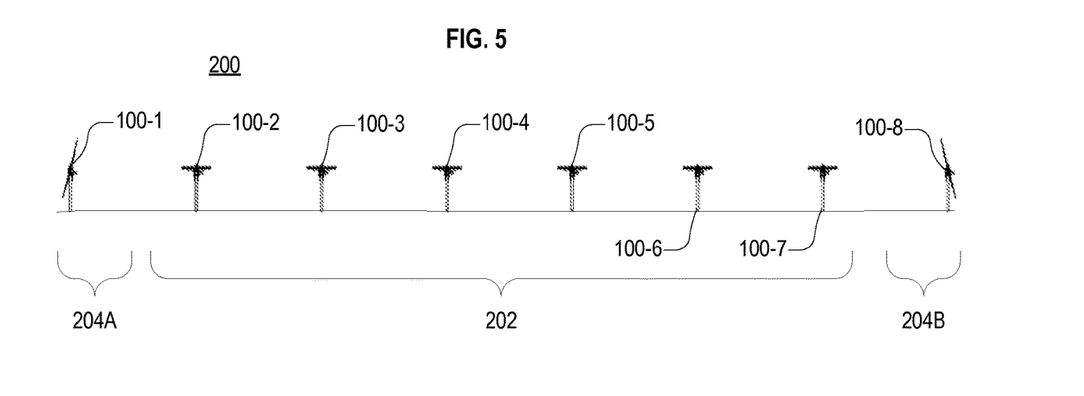
FIG. 5 is a side view of the configuration shown in FIG. 4 according to an embodiment.

The first and eighth solar trackers 100-1 and 100-8 disposed in the first and second exterior zones 204A and 204B, respectively, are operable to act as wind fences for the second to seventh solar trackers 100-2 to 100-7 disposed in the interior zone 202, as shown in FIGS. 3 through 5.

In an embodiment, one or more of the first and eighth solar trackers 100-1 and 100-8 disposed in the first and second exterior zones 204A and 204B includes a torque tube configured within a frame structure having a first interior stop region and a second interior stop region. The first interior stop region and a second interior stop region may correspond to a first angle and a second angle, respectively, and the one or more of the solar trackers 100-1 and 100-8 may be configured to move the torque tube about an arc from the first angle to the second angle.

In the normal operating mode, the first to eighth solar trackers 100-1 to 100-8 may each be configured at angles that optimize collection of solar energy by the solar array system 200. A person of ordinary skill in the art would understand how to determine the angles that optimize collection of solar energy.

The solar array system 200 may operate in the normal operating mode when a wind characteristic is in a first range. In an embodiment, the first range may include a wind velocity in a direction orthogonal to a long axis of torque tubes of the first to eighth solar tracker 100-1 to 100-8 being below a first threshold value.

FIG. 3 shows the solar array system 200 in a partial defense mode wherein outer solar trackers, that is, the first and eighth solar trackers 100-1 and 100-8 disposed in the first and second exterior zones 204A and 204B, respectively, are each configured as a wind fence, according to an embodiment. The solar array system 200 may operate in the partial defense mode when a wind characteristic is in a second range. The second range may include a wind velocity greater than the first threshold value and less than a second threshold value.

The first and eighth solar trackers 100-1 and 100-8 disposed in the first and second exterior zones 204A and 204B act as a wind fence for the second to seventh solar trackers 100-2 to 100-7 disposed in the interior zone 202 when in the partial defense mode. The second to seventh solar trackers 100-2 to 100-7 operate as in the normal operating mode when in the partial defense mode.

The first and eighth solar trackers 100-1 and 100-8 may be configured as a wind fence by configuring the first and eighth solar trackers 100-1 and 100-8 to have an angle according to one of a first interior stop region and a second interior stop region of the respective torque tubes when in the partial defense mode. When a solar tracker is configured as a wind fence, the solar modules of the solar tracker are configured to function as a wind shield.

In an embodiment, only one of the first and eighth solar trackers 100-1 and 100-8 may be configured as a wind fence when in the partial defense mode, and the other of the first and eighth solar trackers 100-1 and 100-8 may operate as in the normal operating mode when in the partial defense mode. For example, in an embodiment, only the one of the first and eighth solar trackers 100-1 and 100-8 that is upwind of the interior zone 202 is configured as a wind fence in the partial defense mode.

FIG. 4 shows a perspective view of the solar array system 200 in a full defense mode according to an embodiment. FIG. 5 is a side view of the solar array system 200 in the full defense mode of FIG. 4.

The solar array system 200 may operate in the full defense mode when a wind characteristic is in a third range. The third range may include a wind velocity greater than the second threshold value.

One or more of the first and eighth solar trackers 100-1 and 100-8 may be configured as a wind fence when in the full defense mode, as described for FIG. 3. The second to seventh solar trackers 100-2 to 100-7 are locked at a 0 degree angle (that is, are locked in a substantially horizontal position) when in the full defense mode.

In an embodiment, only one of the first and eighth solar trackers 100-1 and 100-8 may be configured as a wind fence when in the full defense mode, and the other of the first and eighth solar trackers 100-1 and 100-8 may locked at the 0 degree angle. For example, in an embodiment, only the one of the first and eighth solar trackers 100-1 and 100-8 that is upwind of the interior zone 202 is configured as a wind fence in the full defense mode.

Figure 6:
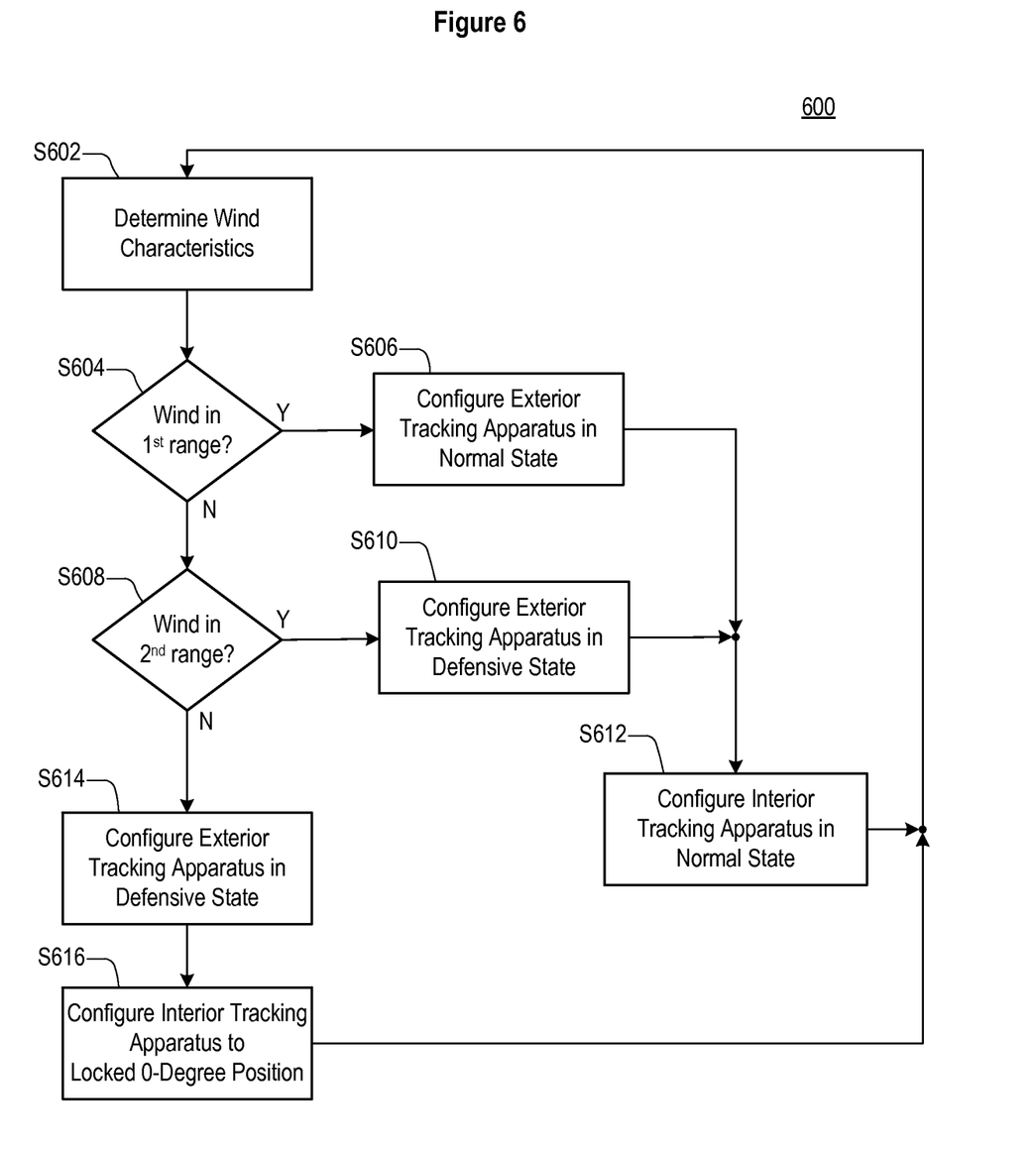
FIG. 6 illustrates a process of operating a solar array system according to an embodiment.

FIG. 6 illustrates a process 600 of operating a solar array system according to an embodiment. In an example, the solar array system includes an interior zone comprising a plurality of interior tracker apparatus, and at least one exterior zone including at least one exterior tracker apparatus. Each of the interior and exterior tracker apparatus includes a plurality of solar modules.

In an embodiment, one or more of the interior or exterior tracker apparatus is operable to rotate their respective the solar modules in a range from −60 Degrees to +60 Degrees, wherein 0 degrees corresponds to a horizontal disposition of the solar modules. In an embodiment, each of the interior tracker apparatus is operable to lock their respective solar modules at 0 Degrees.

At S602, the process 600 determines a predetermined wind characteristic during a time frame, the wind characteristic being in one of a plurality of ranges. In an embodiment, the plurality of ranges includes at least a first range, a second range, and a third range.

At S604, the process 600 determines whether the wind characteristic is in the first range. The process 600 proceeds to S606 when the wind characteristic is determined to be in the first range, and proceeds to S608 otherwise.

At S606, the process 600 configures the one or more exterior tracker apparatus in a normal state when the wind characteristic is in the first range. The normal state may be a sun-tracking configuration adapted to collect solar energy. The process 600 then proceeds to S612.

At S608, the process 600 determines whether the wind characteristic is in the second range. The process 600 proceeds to S610 when the wind characteristic is determined to be in the second range, and proceeds to S614 otherwise.

At S610, the process 600 configures the one or more exterior tracker apparatus in a defensive state when the wind characteristic is in the second range. The defensive state may be a wind fence state. The wind fence state may include disposing the solar modules of the exterior tracker apparatus at either 60 or −60 degrees. The process 600 then proceeds to S612.

At S612, the process 600 configures the plurality of interior tracker apparatus in a normal state when the wind characteristic is in the first or second range. The process 600 then returns to S602.

At S614, the process 600 configures the one or more exterior tracker apparatus in the defensive state, such as described above with respect to S610, when the wind characteristic is not in the first or second range, that is, when the wind characteristic is in the third range. In an example, the defensive state can be configured in a locked flat position or normal position with respective gravity, while the outer modules are in an offensive state to divert wind away from the inner region of the array of solar panels. Of course, the term "offensive" and "defensive" are used in its literal meaning, and should be interpreted using ordinary meaning, and may be used interchangeably.

At S616, the process 600 configures the plurality of interior tracker apparatus in a locked 0 degree state when the wind characteristic is in the third range. In the locked 0 degree state, the solar modules of the plurality of interior tracker apparatus may be substantially parallel to the ground. The process 600 then returns to S602.

The process 600 may be carried out using a controller of the solar array system. In an embodiment, the controller performs the process 600 using a processor or controller executing computer programming instructions stored in a non-transitory computer-readable media. In an embodiment, the controller performs the process 600 using custom logic circuits embodying operations of the process 600.

In an example, the present invention provides a solar tracker system. The solar tracker system has a first pillar structure and a second pillar structure. In an example, the system has a torque tube configured between the first pillar structure and the second pillar structure and a plurality of solar modules configured spatially along the torque tube from a first end to a second end.

In an example, the system has a panel rail configured to each of the plurality of solar modules. That is, the system has a plurality of panel rail devices coupling respective plurality of solar modules.

In an example, the system has a clamp device coupled to sandwich the torque tube between a lower portion of the clamp device and each panel rail. In an example, the clamp device is a U-bolt that has a lower region coupled to the lower region of the torque tube, and each of the bolt structures is inserted into an opening in the panel rail. The panel rail is disposed underlying a pair of solar modules and is configured to hold the pair of solar modules, while being clamped onto the torque tube using the U-bolt and a pair of bolts securing the panel rail to the torque tube.

In an example, the system has a mechanical isolator comprising an elastic material configured to separate the panel rail from the torque tube cause destructive interference with a natural resonant frequency of the system without the mechanical isolator to reduce a mechanical vibration of the system. In an example, the elastic material comprises a rubber or a polymer that has sufficient rigidity. In an example, the material can also be configured with one or more openings to further allow the thickness of material to flex and/or absorb vibration. Further details of the system can be found in U.S. Ser. No. 14/734,981, commonly assigned, and hereby incorporated by reference herein in its entirety. The '981 application is assigned to NEX- TRACKER INC., 6200 PASEO PADRE PARKWAY, FREMONT, CALIFORNIA 94555, and titled MASS DAMPER FOR SOLAR TRACKER.

Figure 7:
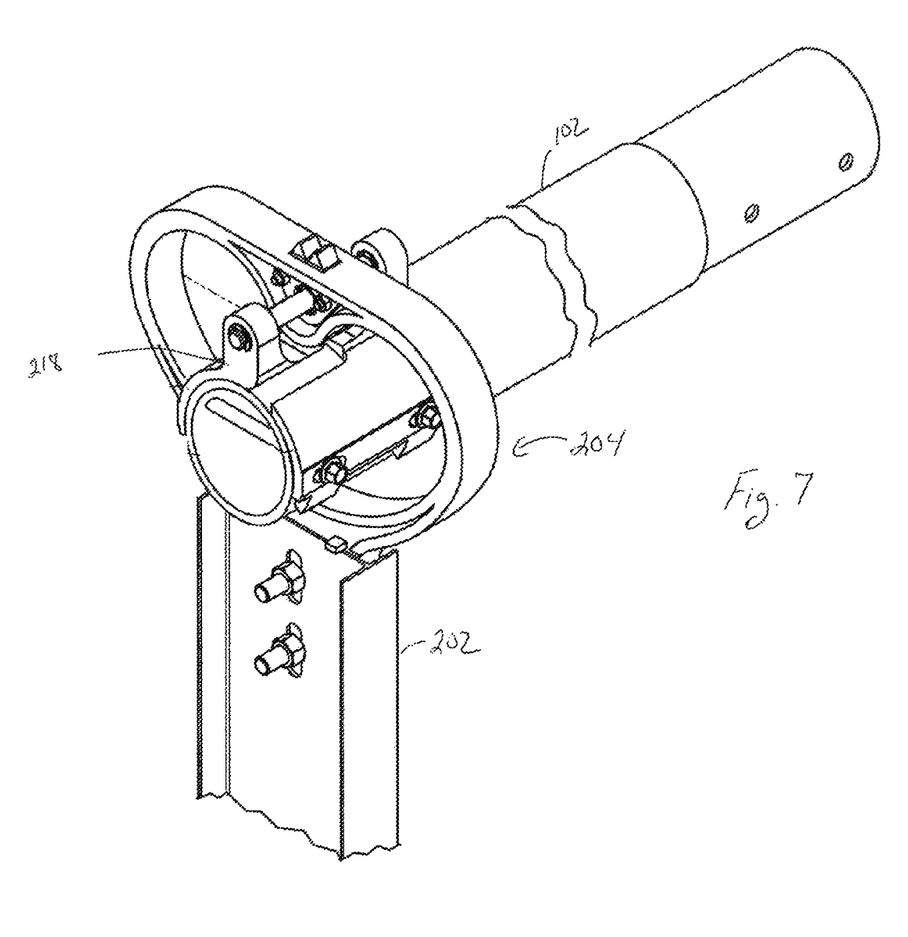
FIG. 7 is a perspective view of a first end of a solar tracker in accordance with the present disclosure.
Figure 8:
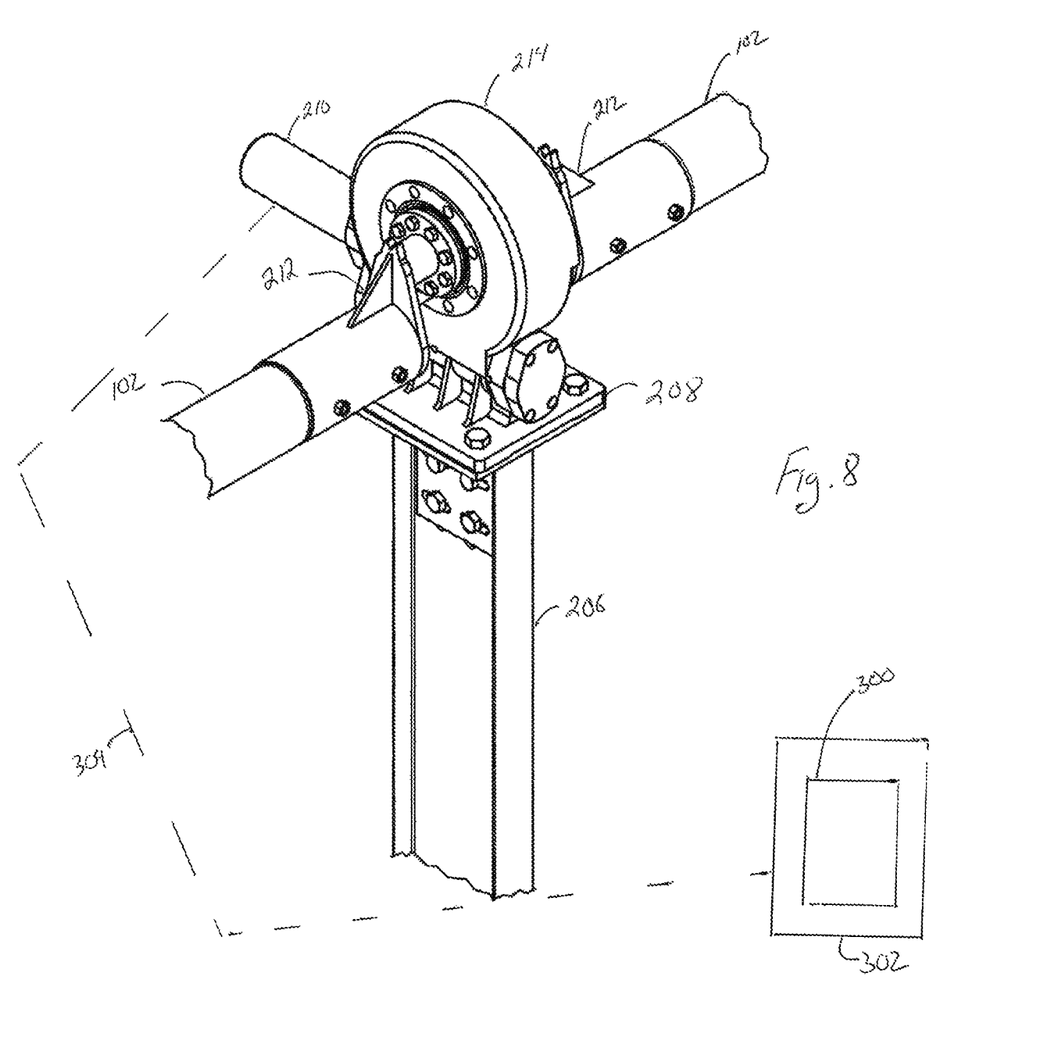
FIG. 8 is a perspective view of a second end of a solar tracker in accordance with the present disclosure.
Figure 9:
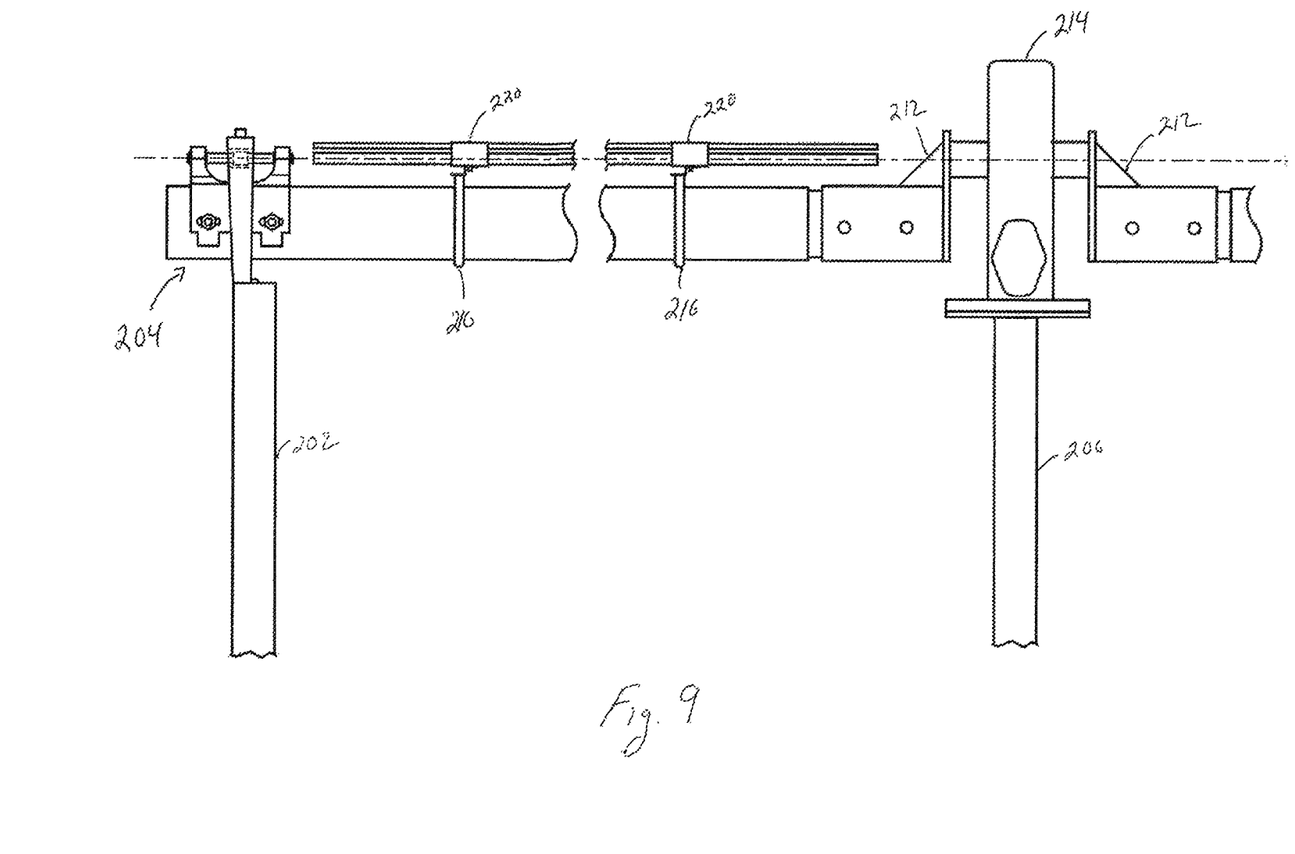
FIG. 9 is a side view of a solar tracker in accordance with the present disclosure.

In a specific embodiment depicted in FIGS. 7 and 8, the present invention provides a tracker apparatus for solar modules. The tracker apparatus has a first pier 202 comprising a first pivot device 204 and a second pier 206 comprising a drive mount 208. The drive mount 208 is capable for construction tolerances in at least three-axis, and is configured to a drive device 210. The drive device 210 has an off-set clamp device 212 coupled to a cylindrical bearing device 214 coupled to a clamp member. The apparatus has a cylindrical torque tube 102 operably disposed on the first pier and the second pier. The cylindrical torque tube 102 comprises a first end and a second end, and a notch not shown). The notch is one of a plurality of notches spatially disposed along a length of the cylindrical torque tube. The apparatus has a clamp 216 configured around an annular portion of the cylindrical torque tube 102 and mate with the notch to prevent movement of the clamp. The clamp comprises a support region configured to support a portion of a solar module.

In an alternative embodiment, the present invention provides an alternative solar tracker apparatus. The apparatus has a drive device 210, a crank 212 coupled to the drive device 210 and configured in an offset manner to a frame assembly 220. The frame assembly 220 is coupled to a plurality of solar modules.

In an example, the apparatus has a continuous torque tube spatially disposed from a first region to a second region. The crank comprises a first crank coupled to a first side of the drive device and a second crank coupled to a second side of the drive device. The crank comprises a first crank coupled to a first side of the drive device and a second crank coupled to a second side of the drive device; and further comprises a first torque tube coupled to the first crank and a second torque tube coupled to the second crank. The crank comprises a first crank coupled to a first side of the drive device and a second crank coupled to a second side of the drive device; and further comprises a first torque tube coupled to the first crank and a second torque tube coupled to the second crank, and further comprises a first swage fitting coupling the first crank to the first torque tube and a second swage fitting coupling the second crank to the second torque tube. The apparatus also has a pier coupled to the drive device. In an example, the apparatus also has a drive mount coupled to a pier.

In an alternative embodiment, the present invention provides an alternative solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube.

In an example, the drive motor is operable to move the torque tube about the center of rotation and is substantially free from a load. The center of rotation is offset from a center of the cylindrical torque tube.

In an alternative embodiment, the present invention provides a solar tracker apparatus. The apparatus has a clamp housing member configured in a upright direction. The clamp housing member comprises a lower region and an upper region. The lower region is coupled to a pier structure, and the upper region comprises a spherical bearing device. The upright direction is away from a direction of gravity. The apparatus has a clam shell clamp member coupled to the cylindrical bearing and a torque tube coupled to the spherical bearing to support the torque tube from the upper region of the clamp housing member. The torque tube is configured from an off-set position from a center region of rotation.

In an example, the apparatus is configured substantially free from any welds during assembly. Reduced welding lowers cost, improves installation time, avoids errors in installation, improves manufacturability, and reduces component count through standardized parts. The torque tube 102 is coupled to another torque tube via a swage device within a vicinity of the clam shall clamp member 218. In an example, the connection is low cost, and provides for strong axial and torsional loading. The apparatus is quick to install with the pokey-yoke design. The torque tube 102 is coupled to an elastomeric damper in line to dampen torque movement to be substantially free from formation of a harmonic waveform along any portion of a plurality of solar panels configured to the torque tube. The apparatus also has a locking damper or rigid structure to configure a solar panel coupled to the torque tube in a fixed tilt position to prevent damage to stopper and lock into a foundation-in a position that is substantially free from fluttering in an environment with high movement of air. The apparatus further comprises a controller 300 (FIG. 8) apparatus configured in an inserter box 302 provided in an underground region to protect the controller apparatus. The apparatus has a drive device 210 to linearly actuate the torque tube. In an example, the apparatus uses an electrical connection 304 coupled to a drive device. In an example, the spherical bearing allows for a construction tolerance, tracker movement, and acts as a bonding path of least resistance taking an electrical current to ground. The apparatus can be one of a plurality of tracker apparatus configured in an array within a geographic region. Each of the plurality of tracker apparatus is driven independently of each other to cause each row to stow independently at a different or similar angle.

Still further, the present invention provides a tracker apparatus comprising a clam shell apparatus, which has a first member operably coupled to a second member to hold a torque tube in place.

In an example, the apparatus also has a clamp housing operably coupled to the clam shell apparatus via a spherical bearing device such that the spherical bearing comprises an axis of rotation. The axis of rotation is different from a center of the torque tube. The apparatus further comprises a solar module coupled to the torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, each pair of torque tubes is swaged fitted together. Each of the torque tubes is cylindrical in shape. Each of the plurality of torque tubes is characterized by a length greater than 80 meters. Each of the torque tubes comprises a plurality of notches. In an example, the apparatus also has a plurality of U-bolt devices coupled respectively to the plurality of notches. Each of the plurality of torque tubes are made of steel.

In an alternative embodiment, the present invention provides a tracker apparatus having a pier member comprising a lower region and an upper region. A clamp holding member is configured to the upper region and is capable of moving in at least a first direction, a second direction opposite to the first direction, a third direction normal to the first direction and the second direction, a fourth direction opposite of the third direction, a fifth direction normal to the first direction, the second direction, the third direction, and the fourth direction, and a sixth direction opposite of the fifth direction.

In yet an alternative embodiment, the present invention provides a solar tracker apparatus. The apparatus has a clamp housing member configured in a upright direction. The clamp housing member comprises a lower region and an upper region. The lower region is coupled to a pier structure. The upper region comprises a spherical bearing device. The upright direction is away from a direction of gravity. The apparatus has a clam shell clamp member coupled to the cylindrical bearing and the clam shell clamp being suspended from the cylindrical bearing. In an example, the apparatus has a torque tube comprising a first end and a second end. The first end is coupled to the spherical bearing to support the torque tube from the upper region of the clamp housing member. The torque tube is configured from an off-set position from a center region of rotation. The apparatus has a drive device coupled to the second end such that the drive device and the torque tube are configured to be substantially free from a twisting action while under a load, e.g., rotation, wind, other internal or external forces.

In an example, the present invention provides a solar tracker apparatus comprising a clamp assembly, the clamp assembly comprising a housing having an opening having a major plane normal to a length of a continuous torque tube, the opening comprising a first inner region and a second inner region, the first inner region acts as a first stop for the continuous torque tube when moved in a first radial direction until contact with the first inner region, and the second inner region acts as a second stop for the continuous torque tube when moved in a second radial direction until contact with the second inner region, the housing having a pivotable hanger assembly configured to suspend the continuous torque tube such that the continuous torque tube traverse through the major plane. In an example, the apparatus comprises a center of mass with the pivotable hanger assembly the continuous torque tube comprising a plurality of cylindrical torque tubes configured together in a continuous length from a first end to a second end such that the center of mass is aligned with a center of rotation of the cylindrical torque tubes to reduce a load of a drive motor operably coupled to the cylindrical torque tube. Further details can be found in U.S. Ser. No. 14/184,656 filed Feb. 19, 2014, and titled BALANCED SOLAR TRACKER CLAMP, commonly assigned, and hereby incorporated by reference herein in its entirety.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A solar tracker array comprising:
a plurality of solar trackers arranged in a generally north-south orientation, each solar tracker including:
  a drive device;
  a rotatable torque tube coupled to the drive device; and
  a plurality of solar modules arranged spatially along and supported by the rotatable torque tube; and
a controller, wherein the controller is configured to:
  periodically determine a strength and direction of wind, cause the drive device to rotate a first solar tracker of the plurality of solar trackers to a position where the plurality of solar modules supported by the first solar tracker act as a wind shield for a second solar tracker of the plurality of solar trackers when the wind exceeds a predetermined speed from a predetermined direction, wherein the plurality of solar modules supported by the first solar tracker are rotated to a non-zero angle with respect to a horizontal direction normal to a direction of gravity to change a direction of on-coming wind to move substantially over a plurality of solar modules supported by the second solar tracker, and
  cause the drive device to rotate the second solar tracker of the plurality of solar trackers to a position wherein the plurality of solar modules supported by the second solar tracker are arranged substantially normal to the direction of gravity.

2. The solar tracker array of claim 1, wherein the first solar tracker of the plurality of solar trackers is located in an exterior zone of the solar tracker array and the second solar tracker of the plurality of solar trackers is located in an interior zone of the solar tracker array, and
wherein the solar modules in the exterior zone are driven via the controller to an offensive position to divert the wind, while the plurality of solar modules in an interior region are driven via the controller to a defensive position where each of the solar modules in the interior zone are protected by the plurality of solar modules in the exterior zone.

3. The solar tracker array of claim 1, further comprising an exterior zone and an interior zone,
wherein each of the plurality of solar modules in the exterior zone is configured to be rotated to act as a wind fence for the solar modules in the interior zone of the solar tracker array.

4. The solar tracker array of claim 1, wherein each solar tracker further includes:
a crank coupled to the drive device and configured in an offset manner to a first end of the rotatable torque tube;
a frame assembly coupled to the rotatable torque tube, the frame assembly coupled to the plurality of solar modules; and
a clamp assembly comprising a housing configured to be coupled to a second end of the rotatable torque tube such that the rotatable torque tube is coupled to the housing, the housing comprising an opening having a major plane normal to a length of the rotatable torque tube, the opening comprising a first inner region and a second inner region, the first inner region acts as a first stop for the rotatable torque tube when moved in a first radial direction until contact with the first inner region, and the second inner region acts as a second stop for the rotatable torque tube when moved in a second radial direction until contact with the second inner region,
wherein the drive device is operable to move the rotatable torque tube about a center of rotation and is substantially free from a load and moves the rotatable torque tube about the center of rotation at substantially a same force from a first radial position to a second radial position, and
wherein the center of rotation is offset from a center of the rotatable torque tube via the crank configured in the offset manner.

5. The solar tracker array of claim 4, wherein the rotatable torque tube moves such that a spatial point of the rotatable torque tube faces the center of rotation as the rotatable torque tube pivots through the first radial position to the second radial position.

6. The solar tracker array of claim 4, wherein the crank comprises a first crank coupled to a first side of the drive device and a second crank coupled to a second side of the drive device, the first crank comprising a first flange connected to the first side of the drive device, the second crank comprising a second flange connected to the second side of the drive device, the first crank further comprising a first arm coupled to a first cylinder swage fitted to a first end of a first portion of the rotatable torque tube, the second crank further comprising a second arm coupled to a second cylinder swage fitted to a second end of a second portion of the rotatable torque tube, wherein the first and second portions of the rotatable torque tube are offset from an axis of the drive device.

7. The solar tracker array of claim 4, wherein the crank comprises a first crank coupled to a first side of the drive device and a second crank coupled to a second side of the drive device; and further comprises a first portion of the rotatable torque tube coupled to the first crank and a second portion of the rotatable torque tube coupled to the second crank.

8. The solar tracker array of claim 4, wherein the crank comprises a first crank coupled to a first side of the drive device and a second crank coupled to a second side of the drive device; and further comprises a first portion of the rotatable torque tube coupled to the first crank and a second portion of the rotatable torque tube coupled to the second crank, and further comprises a first swage fitting coupling the first crank to the first portion of the rotatable torque tube and a second swage fitting coupling the second crank to the second portion of the rotatable torque tube.

9. The solar tracker array of claim 4, further comprising a pier coupled to the drive device, the pier comprising a plurality of support structures coupled to a drive device support, the drive device support having a first member coupled to the plurality of support structures, and a second member coupled to the drive device.

10. The solar tracker array of claim 4, further comprising a drive mount coupled to a pier.

11. A solar tracker system comprising:

an array of solar trackers, each solar tracker including a plurality of solar modules, the array of solar trackers including:

an interior zone including a plurality of solar trackers;

an exterior zone including at least one solar tracker including a frame structure having a first interior stop region and a second interior stop region, a torque tube configured within the frame structure, and a drive device coupled to the torque tube, the drive device being capable of rotating the torque tube from a first position to a second position; and a controller, wherein the controller is configured to:

periodically determine a strength and direction of wind, and cause the drive device to rotate the at least one solar tracker in the exterior zone to a position where the plurality of solar modules supported by the at least one solar tracker in the exterior zone are at a non-zero angle with respect to a horizontal direction normal to a direction of gravity to act as a wind shield for the plurality of solar modules supported by the plurality of solar trackers in the interior zone when the wind exceeds a predetermined speed from a predetermined direction.

12. The solar tracker system of claim 11, wherein the controller is configured to cause the plurality of solar trackers in the interior zone to rotate to a position wherein the plurality of solar modules supported by the plurality of solar trackers in the interior zone are arranged substantially normal to the direction of gravity.

13. The solar tracker system of claim 12, further comprising two solar trackers in the exterior zone, one on a first side of the array of solar trackers and one on an opposite side of the array of solar trackers.

\* \* \* \* \*